May 25, 1926.
B. DICK ET AL
1,586,184
DYNAMO ELECTRIC MACHINE
Filed April 17, 1924
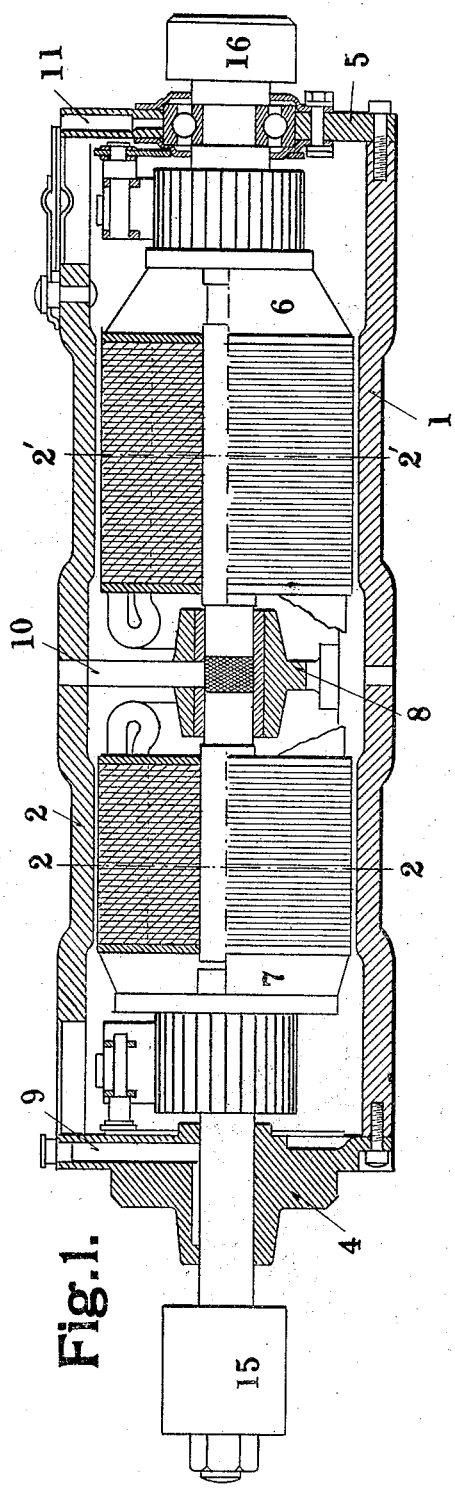
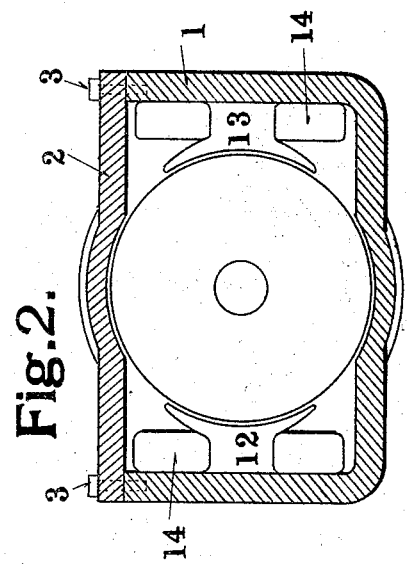
INVENTORS
B. DICK
J. B. DYER
BY E. E. Huffman
ATTORNEY Patented May 25, 1926.

1,586,184

UNITED STATES PATENT OFFICE.

BURNS DICK, OF ST. LOUIS, AND JOHN B. DYER, OF FERGUSON, MISSOURI, ASSIGNORS TO WAGNER ELECTRIC CORPORATION, OF ST. LOUIS, MISSOURI, A CORPORATION OF DELAWARE.

DYNAMO-ELECTRIC MACHINE.

Application filed April 17, 1924. Serial No. 707,043.

Our invention relates to electrical starting and current generating apparatus designed particularly for use in engine driven vehicles.

The object of the invention is to decrease the manufacturing cost of such apparatus. According to the most common practice at present the motor for starting an automobile engine and the generator for furnishing current for lights, ignition and battery charging, are built as separate machines and separately mounted on the vehicle. In accordance with our invention the characteristics and advantages of separate machines are retained but the cost thereof materially reduced by combining them into one unit requiring only one mounting and two instead of four end plates.

Our invention further comprises an improved form of field frame and method of manufacture of the same, which further reduces the cost.

In the accompanying drawings Figure 1 is a vertical longitudinal view, partially in section and partially in elevation, of an electrical unit embodying our invention; and Figure 2 is a transverse view partly in section and partly in elevation along the line 2—2 or 2'—2' of Figure 1.

The frame 1 of the unit shown in the drawings, is formed from a rectangular piece of flat stock of suitable thickness and of magnetically conductive material, bent into the form of a trough substantially U-shaped in cross section, portions of the bottom of the trough being pressed upward to a greater extent than certain other portions. The longitudinal opening of this trough-shaped frame is closed by a sheet 2 of magnetic material pressed into the form shown, and having its edges secured to the frame 1 by means of bolts 3 threaded into the frame. The ends of the frame are closed by end plates 4 and 5, which carry armature shaft bearings. In the machine as illustrated in Figure 1, 6 is the generator armature and 7 is the motor armature, and these armatures are on separate shafts the inner ends of which, however, have a common bearing in bearing pedestal 8 secured to the frame 1. The three bearings of the machine are provided with lubricating ducts 9, 10 and 11. To the inner faces of the sides of the frame are attached a pair of oppositely located pole pieces 12 and 13 cooperating with the motor armature, and a like pair of pole pieces, similarly attached, are positioned to cooperate with the generator armature. These pole pieces carry field coils 14, and in both the motor and the generator these coils are so excited as to cause the pole pieces to have like polarity whereby consequent magnetic poles will be formed in the field frame displaced 90 electrical degrees from the pole pieces, and in order that arcuate pole faces for these consequent poles may readily be formed concentric with the armature and the faces of the pole pieces, with a mimimum amount of machining, the bottom of the trough and the cover plate are formed with longitudinally extending depressions with, however, the portions of these depressions which are to form consequent pole faces, raised above the other portions. After the pole pieces are attached a cutting tool is passed longitudinally through the frame and forms properly shaped pole faces on these raised portions of the depressions, and at the same time the tool shapes the faces of the pole pieces which carry the coils. By the arrangement just described, the machining of the interior of the frame to produce a uniform air gap between the armature and the pole faces in the complete machine is reduced in that none of the portions of the interior of the frame except those which form pole faces are engaged by the cutting tool.

As indicated in Figure 1, the cover plate 2 is made somewhat shorter than the frame 1, thus providing openings for access to the motor and generator commutators and brushes. In Figure 1, 15 diagrammatically illustrates a gear, sprocket-wheel or other suitable device for connecting the motor directly or through gearing to a part of the engine such as the flywheel, and 16 diagrammatically illustrates means for connecting the generator to be driven by the engine. It will be understood of course that an overrunning clutch or other device for the same purpose will be included between the motor shaft and the engine whereby the engine, when running, will not drive the motor. Since the motor and generator do not normally operate at the same time, our improved construction reduces the magnetic reluctance of the magnetic circuits of each machine for a given frame material and thus reduces the necessary frame thickness from the value it would have if the machines were separate, since when the motor is operating, portions of the generator frame are available as a part of its field magnetic circuit; and likewise when the generator is operating, the motor portions of the frame are available as a part of its magnetic field circuit.

It will be understood that the form of the frame described is suitable for motors or generators built separately and makes possible the manufacture of an efficient four-pole machine at lower cost than the same have heretofore been produced.

Having fully described our invention, what we claim as new and desire to secure by Letters Patent of the United States is:

1. The method of forming a field frame for dynamo electric machines which comprises forming flat stock into trough shape with portions of the interior surface raised and passing a cutting tool longitudinally through said trough to form arcuate pole faces on the raised portions.

2. The method of forming a field frame for dynamo electric machines which comprises forming flat stock into trough shape with portions of the interior surface raised, attaching pole pieces to the interior of the trough, and passing a cutting tool longitudinally through said trough to form arcuate pole faces on the raised portions and to shape the faces of the pole pieces.

3. A dynamo electric unit comprising a motor armature and a generator armature linearly arranged, a single field frame for said armatures, said frame comprising a sheet of magnetic material bent into the form of a trough and completely embracing both of said armatures linearly and transversely, and a cover for the longitudinal frame opening.

4. A dynamo electric unit comprising a motor armature and a generator armature linearly arranged, a single field frame for said armatures, said frame comprising a sheet of magnetic material bent into the form of a trough and completely embracing both of said armatures linearly and transversely, a single bearing member for the inner ends of the motor and generator armature shafts, said bearing secured to the frame intermediate its ends, and a cover for the longitudinal frame opening.

In testimony whereof, we have hereunto set our hands this the 12th day of April, 1924.

BURNS DICK.
JOHN B. DYER.